United States Patent [19]

Toman

[11] Patent Number: 4,808,999
[45] Date of Patent: Feb. 28, 1989

[54] TOWED DECOY WITH FIBER OPTIC LINK

[75] Inventor: Donald Toman, Pleasantville, N.Y.

[73] Assignee: Loral Corp., Yonkers, N.Y.

[21] Appl. No.: 156,968

[22] Filed: Feb. 18, 1988

[51] Int. Cl.⁴ .............................................. G01S 7/38
[52] U.S. Cl. ........................................ 342/15; 342/9; 342/13; 342/54
[58] Field of Search ............................. 342/9, 13–15, 342/54

[56] References Cited

U.S. PATENT DOCUMENTS

| | | | |
|---|---|---|---|
| 2,995,740 | 8/1961 | Shreckengost | 347/7 |
| 3,241,145 | 3/1966 | Petrides | 343/705 |
| 3,243,592 | 3/1966 | Tomiyasu et al. | 250/199 |
| 3,339,201 | 8/1967 | Fischer et al. | 342/14 |
| 3,700,900 | 10/1972 | Herleikson | 250/199 |
| 3,766,392 | 10/1973 | Nelson | 250/199 |
| 3,836,968 | 9/1974 | Schillreff | 342/15 X |
| 3,905,010 | 9/1975 | Fitzpatrick | 340/18 NC |
| 3,943,357 | 3/1976 | Culver | 250/199 |
| 4,021,661 | 5/1977 | Levine | 250/199 |
| 4,393,518 | 7/1983 | Briley | 455/617 |
| 4,433,333 | 2/1984 | Manoogian et al. | 342/14 |
| 4,479,701 | 10/1984 | Newton et al. | 350/96.16 |
| 4,546,249 | 10/1985 | Whitehouse et al. | 250/227 |
| 4,547,774 | 10/1985 | Gould | 340/854 |
| 4,646,098 | 2/1987 | Mattern et al. | 342/14 |

*Primary Examiner*—T. H. Tubbesing
*Assistant Examiner*—Mark Hellner
*Attorney, Agent, or Firm*—Charles E. Temko

[57] ABSTRACT

A rf decoy for use with rf repeater devices, transponders, noise jammers and other jamming devices. The decoy is adapted to be towed behind an aircraft using a tow line which incorporates a fiber optic link through which signals are transmitted. The device is excited through rf energy which is modulated on a laser carrier and transmitted through the fiber optic link. While the principal application is to repeaters which are towed behind an aircraft, the invention has utility in free-falling and forward fired transmitters as well as land and sea based vehicles.

3 Claims, 1 Drawing Sheet

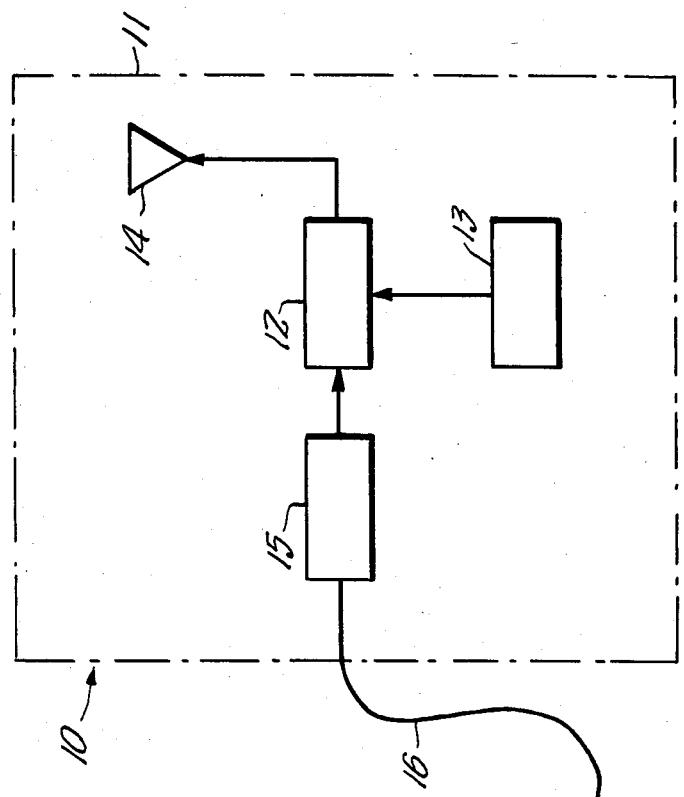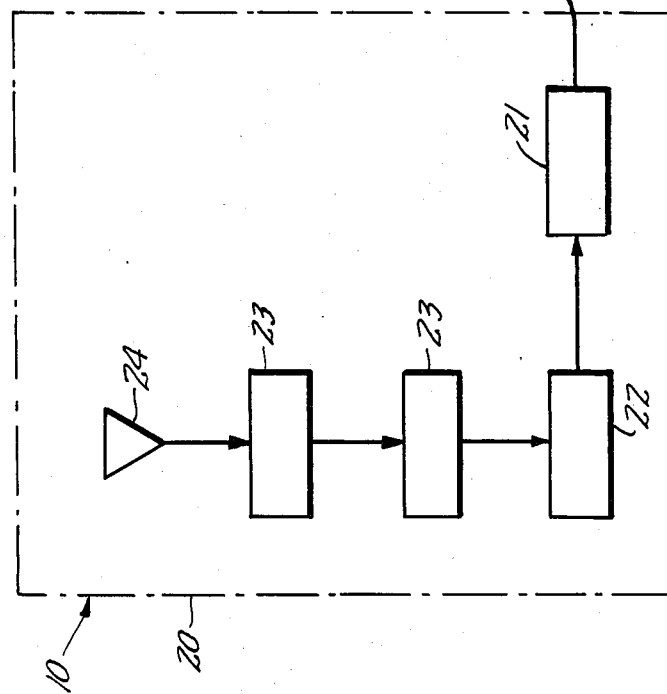

TOWED DECOY WITH FIBER OPTIC LINK

BACKGROUND OF THE INVENTION

This invention relates generally to the field of radar devices, and more particularly to an improved radar decoy serving to confuse radar guided weapons. It is known in the art to provide decoy devices which are dropped, fired, towed or otherwise deployed from the aircraft to be protected. The decoy device forms a preferred target for the enemy weapon guidance system resulting in the weapon missing the target by a sufficient distance to result in survival of the attack by the target.

Present decoy devices depend upon accurately setting a transmitter on the frequency of the target radar before ejection or having a complicated receiving apparatus on board the decoy device to allow generating of the required decoy signal. Present towed devices contain a broadband receiver and transmitter which has a large dynamic range and high power capability, as the result of which it is inherently expensive.

A disadvantage of fixed set-on devices is that they must be accurately pre-programmed to simulate the expected Doppler return of the protected target, even though they may be moving at a different velocity with respect to the enemy radar. In addition, the second order modulations characteristic of the target must be programmed into the device to realistically simulate the signature of the target radar.

Towed repeater devices which contain a receiver transmitter device as well as a techniques generator must have sufficient isolation between the transmitter and the receiver to avoid self-oscillation. This requirement is often difficult to satisfy in the case of a small device, and usually demands a sophisticated antenna design.

SUMMARY OF THE INVENTION

Briefly stated, the present invention contemplates the provision of an improved decoy device of the class described in which the above-mentioned requirements have been met at relatively low cost of manufacture. To obtain this object, use is made of a fiber optic link incorporated directly into a flexible tow line containing a required rf excitation between the exciter portion of the decoy system and the transmitting apparatus in the decoy device. The receiver, techniques generator, if any, and exciter remain on board the protected aircraft, while the transmitting apparatus and the fiber optic demodulator are on board the decoy device. Since the exciter may be selected or non-selected as desired, consistent with cost requirements, the dynamic range requirements of the rf device and the fiber optic excitation link, need not be very large. Likewise, the transmitter need not be high-powered, or linear. The relatively expensive, sophisticated elements of the decoy system are retained on board the protected aircraft. The transmitted rf is coherent with the excitation signal which may be coherent with the radar as required.

A simple repeater loop can be fabricated with the receiver element on board the aircraft and the transmitter on board the decoy device. The isolation between the receiver and transmitter is, of course, due to the relatively long physical separation between the aircraft and the decoy device.

BRIEF DESCRIPTION OF THE DRAWING

In the drawing, to which reference will be made in the specification, the single figure is a schematic block diagram of an embodiment of the invention.

DETAILED DESCRIPTION OF THE DISCLOSED EMBODIMENT

In accordance with the invention, the disclosed embodiment, generally indicated by reference character 10, includes a towed target of suitable configuration, and generally indicated by reference character 11. It supports a known rf transmitter 12 which is preferably a Gallium-arsenide transistor amplifier which is supplied direct-current energy by a battery 13. The transmitter emits microwave energy in the band 6 and 35 Ghz, for example, through an antenna 14 of broad band type. Antennas of this type are described in chapter 18 of "Antenna Engineering Handbook" by Henry Jasik, 1961, published by McGraw Hill, New York City, N.Y. The transmitter amplifier 12 is excited by the demodulated output of a laser receiver 15 which receives a signal from a fiber-optic cable 16. This cable is preferably incorporated at the time of manufacture directly into a larger cable used for towing the member 11 by the aircraft.

The protected aircraft, is indicated by reference character 20, and forms a platform supporting a laser transmitter 21 which is modulated by a modulator 22 with an rf signal derived from techniques generator/receiver 23. This receiver is preferably a superheterodyne type containing various selectivity and dynamic range control features such as bandpass filtering and automatic gain control. The techniques generator may produce any number of desired deception techniques, including velocity pull-off and range pull-off. If desired, the receiver may be part of another system, such as a radar warning receiver set (not shown). The receiver may be as simple as a high-gain broad band rf amplifier. The receiver is connected, in turn, to a receiving antenna 24 which may be of type similar to that used in the transmitting antenna 14.

OPERATION

Upon receipt of a weapon-associated radar signal which it is desired to decoy, the receiving apparatus generates the desired excitation signal which may be a distorted replica of the received radar signal, and modulates the signal upon the laser transmitter, transmitting the modulated laser signal via the fiber-optic link. The laser receiver demodulates the laser signal and transmits the derived rf signal to the transmitter 12 which amplifies the signal and transmits it via the antenna 14 to the weapon-associated radar. The weapon-oriented radar senses the decoy device, rather than the aircraft, so that when the weapon is fired, it will miss the intended target.

I wish it to be understood that I do not consider the invention limited to the precise details of structure shown and set forth in this specification, for obvious modifications will occur to those skilled in the art to which the invention pertains.

I claim:

1. In a radar decoy system for protecting a vehicle against hostile radar detection by means of a decoy device which is physically interconnected in spaced relation relative to the protected vehicle by a flexible cable means, the improvement comprising: an rf receiving means on said vehicle for receiving hostile signals, an rf exciting means on said vehicle responsive to said received signals, an rf transmitting means on said decoy device, and means interconnecting said exciting means and said transmitting means, said last-mentioned means including a laser modulator, a laser transmitter receiving the output of said modulator, a fiber-optic link incorporated into said flexible cable means receiving the output of said laser transmitter, and a laser receiver on said decoy device interconnected to said fiber-optic link and receiving transmitted signals therefrom, said laser receiver being interconnected to said transmitter means.

2. The improvement set forth in claim 1, further characterized in said transmitting means receives rf excitation by an amplitude modulation imposed on said fiber-optic link which is reestablished by amplitude demodulation.

3. The improvement set forth in claim 1, further characterized in said receiving means including a techniques generator.

* * * * *